Patented Sept. 22, 1953

2,653,145

UNITED STATES PATENT OFFICE 2,653,145

METHODS FOR PRODUCING COPOLYMERS IN THE FORM OF DISCRETE PARTICLES

Walter P. Hohenstein, Kew Gardens, N. Y., assignor to The Whitney Blake Company, Hamden, Conn., a corporation of Connecticut No Drawing. Application March 15, 1951, Serial No. 215,876

5 Claims. (Cl. 260—83.5)

The present invention relates to improvements in methods for producing copolymers and relates more particularly to improvements in methods for producing copolymers in the form of discrete particles. The products of the method of the present invention are primarily adapted for use as electrical insulation, though valuable for many other uses.

Before proceeding with a description of certain embodiments of the present invention, it may be here stated that it has long been the practice to produce certain copolymers in the form of discrete particles, but such practice has been mainly limited, when pure copolymers have been desired, to the production of copolymers whose particles are relatively hard, even at the reaction temperature at which they are formed, and hence do not agglomerate to such an extent as to occlude undesired substances between the particles. Where efforts have been made heretofore to produce in the form of discrete bead-like particles copolymers that are relatively soft permanently (such, for instance, as soft styrenic-diolefinic copolymers), the particles have agglomerated during production to such an extent as to occlude serious amounts of the dispersing medium and other foreign substances between the particles. Such occlusions of foreign substances (clays, electrolytes, etc.) deleteriously affect the insulation properties of the copolymers, as well as other properties thereof.

One of the objects of the present invention is to provide a simple, reliable and economical method whereby permanently soft copolymers may be produced in the form of discrete particles.

A further object of the present invention is to provide a superior method whereby soft copolymers may be produced with a minimum occlusion of foreign substances which might deleteriously affect the desired properties of the copolymers.

Another object of the present invention is to provide a superior method of the character referred to, by means of which copolymers of rubber-like character may be produced with substantial freedom from occlusions of foreign substances.

With the above and other objects in view, as will appear to those skilled in the art from the present disclosure this invention includes all features in the said disclosure which are novel over the prior art and which are not claimed in any separate application.

The method of the invention comprises intermixing a plurality of copolymerizable monomers, a polymerization catalyst and a dispersing fluid; the dispersing fluid being substantially a nonsolvent for the monomers and also for the resultant copolymer; mechanically agitating the admixture at a temperature between about 120° F. and about 325° F. until the polymerizing reaction is substantially complete and particles are produced which are solid but soft and, at the reaction temperature, are also tacky; continuing the mechanical agitation while chilling the intermixture to a temperature above the freezing point of the dispersing fluid and below about 50° F. at which temperature agglomeration of the particles and consequent occlusion of impurities between the same is substantially avoided; and subsequently freeing the copolymer particles from the dispersing fluid while the particles are in the said chilled non-tacky and non-agglomerating condition.

Particularly useful copolymers are obtained by the copolymerization of a vinyl compound, such as styrene, its lower alkyl and chlorine substitution products, for example, the methylstyrenes and 3,4-dichlorostyrene, and the lower alkyl esters of acrylic and methacrylic acids, with at least one conjugated aliphatic diolefinic compound, such as butadiene, isoprene, chloroprene, 1,3-pentadiene, 2-methylpentadiene and cyclopentadiene. For convenience, the monomer to be copolymerized with the diolefinic compound is herein generically designated a "vinylidene compound," since it is characterized broadly by the vinylidene radical, $H_2C:C=$, one of the free bonds of which may be satisfied by either hydrogen (e. g. styrene) or an alkyl group (e. g. a methacrylate).

For the purpose of making the present invention clear, the copolymerization of several different combinations of substances will be described.

*Copolymerization of mono-styrene and isoprene*

A suitable autoclave is provided which preferably is equipped with means for effecting the exchange of heat, whereby the contents of the autoclave may be both elevated and lowered in temperature, for purposes as will more fully hereinafter appear. Suitable means are also provided for effecting the agitation or stirring of the contents of the autoclave, and such means may take a wide variety of forms such, for instance, as power-driven stirring blades, or means for effecting the bodily vibration of the entire autoclave and its contents.

The autoclave is charged with appropriate quantities of a suitable dispersing fluid, a suitable catalyst, and both mono-styrene and isoprene.

The dispersing fluid may vary widely and may, for instance, be composed of ethylene glycol with or without the admixture of water, a water dispersion of about 3% bentonite, or any other suitable dispersing fluid which has the characteristics of not being a substantially effective solvent for the mono-styrene or the isoprene, nor for the resultant copolymer. The catalyst, or combinations of catalysts, may also vary widely, as is well known in the art, such, for instance, as benzoyl peroxide, acetyl peroxide, hydrogen peroxide, potassium persulphate, etc.

For purposes of example only, let it be assumed that the autoclave is first charged with from about 2500 to about 3500 grams of ethylene glycol, after which about 500 grams of monostyrene may be introduced into the autoclave, together with about 50 grams of isoprene, in which mixture has been dissolved about 5.5 grams of benzoyl peroxide. The dispersing fluid should be agitated while the said monomers and the said catalyst are being added thereto, and such agitation should be continued until the completion of the hereinafter described chilling of the intermixture.

With the autoclave suitably sealed, the intermixture within the same is heated and simultaneously agitated, and the temperature is preferably raised to about 300° F.

The agitation and high temperature above referred to should be continued until the desired degree of copolymerization has been reached in the resultant discrete copolymer particles, which remain distinct from each other in the dispersing fluid. When the desired degree of copolymerization has been reached, the heat may be shut off, but the agitation is continued to prevent the agglomeration or adherence of the copolymer particles, which agglomeration would result in the occlusion of the dispersing fluid between the particles.

Cooling fluid such, for instance, as brine, may be circulated through the heat-exchange means associated with the autoclave, so as to cool the contents thereof to a temperature below 50° F., and preferably to about 20° F.

During the cooling of the contents of the autoclave as above described, the agitation must be continued until the temperature is lowered to a point whereat the copolymer particles will remain separate and distinct without further agitation.

In instances where a water dispersion of bentonite, or the like, is employed, as the dispersing fluid, the upper temperatures will preferably be kept below the boiling point of water, and the lower temperatures referred to will be preferably kept above the freezing point of water. To secure rapid copolymerization on one hand and to secure the most effective avoidance of agglomeration of the copolymer particles on the other hand, the upper temperatures should be in excess of about 120° F. and the lower temperatures should be below 50° F.

The now chilled and non-tacky copolymer particles will not display any appreciable tendency to agglomerate or adhere together, and the same may be removed from the autoclave and freed of the dispersing fluid by any suitable means such, for instance, as by washing with water, or other suitable media.

Following washing, or equivalent operation, the resultant soft copolymer particles may be permitted to agglomerate, or may be maintained as discrete particles, and may be extruded, injection-molded, or otherwise utilized, and will be found to be free of substances which are injurious to its electrical insulation and other properties.

*Copolymerization of methyl methacrylate and isoprene*

A copolymer of methyl methacrylate and isoprene may be produced by means of the present invention in many specific ways, but for purposes of example, the following procedure may be followed.

A suitable autoclave may be charged with from 2000 to 2500 grams of ethylene glycol, to which may be added from about 180 to about 200 grams of methyl methacrylate, and also from about 20 to 30 grams of isoprene. A suitable catalyst is dissolved in the aforesaid methyl methacrylate and may consist, under the present circumstances, of about 2 grams benzoyl peroxide.

The ethylene glycol (dispersing fluid) should be agitated while the said monomers and the said catalyst are being added thereto, and such agitation should be continued until the completion of the hereinafter-described chilling of the intermixture.

With the autoclave suitably sealed, the mixture within the same is heated while simultaneously agitated, and the temperature is preferably raised to a point within the range between about 275° F. and about 325° F.

The agitation and elevated temperature condition above referred to should be continued until the desired degree of copolymerization has been reached in the resultant discrete copolymer particles of methyl methacrylate and isoprene.

When the desired degree of copolymerization has been reached, the heating may be discontinued, but the agitation should be continued to prevent the agglomeration or adherence of the copolymer particles, which agglomeration, as before noted, would result in the occlusion of the dispersing fluid between the particles.

Suitable cooling fluid such, for instance, as brine or the like, may be circulated through the heat-exchange means associated with the autoclave so as to cool the contents thereof to a suitable temperature—preferably, in this instance, to about 0° F.

The cooling of the contents of the autoclave should be continued, as well as the agitation, until the temperature is lowered to a point whereat the copolymer particles will remain separate and distinct without further agitation.

When the methyl methacrylate and isoprene copolymer particles have been chilled, as above described, the same may be removed from the autoclave and freed of the dispersing fluid by any suitable means.

As a specific mode of freeing the copolymer particles of the dispersing fluid, the following procedure may be followed:

The entire charge may be shifted from the interior of the autoclave to a Buchner-type filter. After the dispersing fluid (ethylene glycol, in the present instance) has drained off through the Buchner-type filter, the particles of the copolymer may be washed with many suitable fluids such, for instance, as cold alcohol or cold mixtures of water and alcohol.

Once the copolymer particles have been freed of the dispersing fluid and preferably after being dried, the temperature of the particles may be permitted to rise to any desired temperature.

Copolymerization of monostyrene, isoprene and 1,3, Butadiene

To produce a substantially pure rubber-like and elastic copolymer of the three monomers now under discussion, about 2000 grams of a water dispersion of about 3% bentonite may be first charged into a suitable autoclave, after which a mixture of about 500 grams of monostyrene, about 50 grams of isoprene and about 25 grams of 1,3, butadiene may be added, which mixture should contain about 5.75 grams of benzoyl peroxide.

The same general procedure with regard to agitation, heating and chilling may be followed as that described in connection with the copolymerization of the two monomers monostyrene and isoprene. In this particular instance, however, it is preferred to extend the heating of the intermixture up to only about 200° F. and to extend the chilling operation down to only about 38° F. The copolymer may be freed of the dispersing fluid by washing with cold water or any other suitable media, though such water or the like may be at a temperature materially above the lowest temperature to which the mixture has been cooled.

General

From the foregoing, it will be seen that all of the examples are characterized by such proportioning of the monomers as will produce a relatively soft solid copolymer, and by the chilling of the copolymer particles to a temperature at which the agglomeration of the particles and the consequent occlusion of impurities between the same, is substantially obviated. It will further be apparent that another characteristic of the present method, as exemplified in the three specific examples above given, is that mechanical agitation is carried on throughout the polymerizing operation and is continued during the succeeding chilling operation; also that the freeing of the copolymer particles from the dispersing fluid is accomplished while the said particles are in substantially the chilled, non-tacky condition referred to, i. e., sufficiently cooled below the elevated copolymerization temperatures, to avoid having the particles adhere or agglomerate until after the said particles have been washed or otherwise freed of dispersing fluids, etc.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

This application is a continuation-in-part of my application Serial No. 546,211 filed July 22, 1944.

I claim:

1. The method of producing solid but relatively soft, rubber-like copolymers which, although tacky at the temperature employed in forming them, are nevertheless substantially free, as finally obtained, from occluded electrolytes and hygroscopic substances deleteriously affecting electrical insulation properties, which comprises intermixing a plurality of including at least one vinylidene compound, at least one conjugated aliphatic diolefinic compound copolymerizable therewith to yield such a relatively soft, rubber-like copolymer product, a polymerization catalyst and a dispersing fluid; the dispersing fluid being substantially a non-solvent for the monomers and also for the resultant copolymer; mechanically agitating the intermixture at a temperature between about 120° F. and about 325° F. until solid but tacky particles of the desired copolymer are produced; continuing the mechanical agitation to prevent agglomeration of the particles while chilling the intermixture to a temperature above the freezing point of the dispersing fluid and below about 50° F. at which said particles are non-tacky; and freeing the copolymer particles from the dispersing fluid while the particles are in the said chilled, non-tacky and non-agglomerating condition.

2. The method as defined in claim 1 wherein the copolymerizable monomers comprise a vinylidene compound of the group consisting of (1) styrene, its (2) lower alkyl and chlorine substitution products, and (3) the lower alkyl esters of acrylic and methacrylic acid, and at least one conjugated aliphatic diolefinic compound.

3. The method as defined in claim 1 wherein the copolymerizable monomers comprise styrene and at least one conjugated aliphatic diolefinic compound.

4. The method as defined in claim 1 wherein the copolymerizable monomers comprise methyl methacrylate and at least one conjugated aliphatic diolefinic compound.

5. The method as defined in claim 1 wherein the dispersing fluid comprises ethylene glycol.

WALTER P. HOHENSTEIN.

No reference cited.